(12) United States Patent
Turon et al.

(10) Patent No.: US 8,214,370 B1
(45) Date of Patent: Jul. 3, 2012

(54) DATA PRE-PROCESSING AND INDEXING FOR EFFICIENT RETRIEVAL AND ENHANCED PRESENTATION

(75) Inventors: Martin A. Turon, Berkeley, CA (US); Rahul Kapur, San Jose, CA (US)

(73) Assignee: Crossbow Technology, Inc., Milpitas, CA (US)

( * ) Notice: Subject to any disclaimer, the term of this patent is extended or adjusted under 35 U.S.C. 154(b) by 461 days.

(21) Appl. No.: 12/412,260

(22) Filed: Mar. 26, 2009

(51) Int. Cl.
*G06F 7/00* (2006.01)
*G06F 17/30* (2006.01)

(52) U.S. Cl. ........................ 707/741; 707/754
(58) Field of Classification Search .................. 707/754, 707/602, 603, 711, 741
See application file for complete search history.

(56) References Cited

U.S. PATENT DOCUMENTS

| | | | | |
|---|---|---|---|---|
| 6,141,699 | A * | 10/2000 | Luzzi et al. ................... | 719/331 |
| 6,278,992 | B1 * | 8/2001 | Curtis et al. .................. | 707/711 |
| 6,615,208 | B1 * | 9/2003 | Behrens et al. ............... | 707/754 |
| 6,714,979 | B1 * | 3/2004 | Brandt et al. ................. | 709/225 |
| 7,069,263 | B1 * | 6/2006 | Yee et al. ...................... | 707/602 |
| 7,162,473 | B2 * | 1/2007 | Dumais et al. ......... | 707/999.003 |
| 7,831,635 | B2 * | 11/2010 | Brothers et al. .............. | 707/803 |
| 7,882,087 | B2 * | 2/2011 | Johnson ........................ | 707/700 |
| 2007/0044539 | A1 * | 3/2007 | Sabol et al. .................. | 73/19.01 |
| 2009/0172058 | A1 * | 7/2009 | Cormode et al. ............. | 708/274 |
| 2009/0182779 | A1 * | 7/2009 | Johnson ........................ | 707/200 |
| 2011/0131597 | A1 * | 6/2011 | Cera et al. ....................... | 725/24 |

OTHER PUBLICATIONS

Chang, F. et al., "Bigtable: A Distributed Storage System for Structured Data," 7th USENIX Symposium on Operating Systems Design and Implementation, 2006, pp. 205-218 of the *Proceedings*, 14 pages.

* cited by examiner

*Primary Examiner* — James Trujillo
*Assistant Examiner* — Pavan Mamillapalli
(74) *Attorney, Agent, or Firm* — Fenwick & West LLP

(57) ABSTRACT

A system, a method and a computer readable storage medium for pre-processing data collected from one or more data sources more accurately summarize data. During the pre-processing, multiple raw data are summarized into a pre-processed datum. By using the pre-processed data entries, more accurate trend data may be generated. Alternatively, data entries are indexed and selectively retrieved based on indices. Decimation of data points are performed based on the indices without retrieving all the data sets from the database, reducing the data access time for returning a query result. Additional data sets may also be retrieved efficiently from the database using the indices.

11 Claims, 12 Drawing Sheets

DATA PRE-PROCESSING AND INDEXING FOR EFFICIENT RETRIEVAL AND ENHANCED PRESENTATION

FIELD OF THE INVENTION

This invention relates to pre-processing data or indexing data for efficient retrieval and accurate characterization of data trend.

BACKGROUND OF THE INVENTION

Certain applications by their nature require vast amounts of data. For example, Wireless Sensor Networks ("WSN") as described in U.S. Pat. No. 7,369,047 to Alan S. Broad et al. may collect vast amounts of data representing various physical properties (e.g., temperature or humidity) at different times. Multiple modules in the WSN sense the physical properties and relay sensor data wirelessly to a base station. The data collected at the base station may then be funneled into a database for storage. As the number of modules or the frequency of data collection increases, the amount of data collected by the WSN increases proportionally. Sometimes, the data may be collected over an extended period of time ranging from months to years, resulting in considerable amounts of data for storage and processing.

When a query request is received from a user, a search may be performed on the database to retrieve pertinent data sets. The query often requires binary searches across data entries stored in the database. Although it is preferable to return query results to the user instantaneously, the data access time increases as the amount of data stored in the database increases. The increased data access time makes it difficult to satisfy users' demand for real-time response. Especially if the data requests are received simultaneously from multiple users, the database may be burdened with numerous requests and fail to return the results in real-time.

The retrieved data sets may be processed and presented to the user using visual tools such as graphs or charts to help users identify any trends or correlation between parameters. If the number of retrieved data sets is large, the graphs or charts may become overpopulated with data. Further, if the retrieved data set exceeds the number of pixels allocated to the graphs or charts, only a subset of retrieved data sets may be displayed on the screen. To select the subset of retrieved data to be displayed, the retrieved data must be decimation or summarized to a smaller number appropriate for display. As more data sets are retrieved, more time is required to decimate or summarize the retrieved data sets. The accumulated retrieval time and processing time may result in a significant delay in presenting the graphs or charts to the user.

SUMMARY OF THE INVENTION

Embodiments relate to a method, a system and a computer readable storage medium for pre-processing two or more data into a summarized datum. The summarized datum is a representative datum for a time period covered by the two or more data. Summarized data covering different time periods may be generated from other data. The pre-processing may be performed offline to store and generate summarized data for multiple data sets before receiving a query request. When a request is received, the summarized data covering the queried time period are returned. By pre-processing the summarized data, the need for further processing to decimate the data may be obviated or reduced.

In one embodiment, the pre-processing includes at least one of averaging the two or more data, selecting a minimum or maximum value of the two or more data, obtaining a value based on polynomial fitting of the two or more data, or selecting a median value of the two or more data.

Embodiments also relate to a method, a system and a computer readable storage medium for determining data entries to be retrieved based on indices assigned to the data entries. Each data is associated with a timestamp based on which an index is assigned to each of the data. After receiving a request for a subset of the data associated the timestamps within a time range, the data within the time range is determined based on the indices. Instead of retrieving data entries from a database and then reducing the number of data entries, indices of the data entries for retrieval are computed. Then the data entries corresponding to the computed indices are retrieved. By determining the data entries for retrieval based on indices and retrieving the data entries corresponding to the indices, fewer queries are made on the database.

In one embodiment, the number of data entries having the timestamp within the time range is determined by searching for a starting datum having a timestamp after a starting time of the time range, and a last datum having a time stamp before an ending time of the time range. Indices of the starting datum and the last datum are then determined. The number of data entries within the time range is determined by computing a difference between the indices of the starting datum and the ending datum.

In one embodiment, the indices are computed by determining an increment value for indices based on a limit and the difference between the first index and the second index. The limit represents the maximum number of data entries to be returned to the client device. Then an array of indices for retrieval of the first data by adding multiples of the increment value to the index of the starting datum.

DETAILED DESCRIPTION OF INVENTION

Embodiments of the invention relate to a system, a method and a computer readable storage medium for pre-processing data collected from one or more data sources to generate summarized data. By using the summarized data, more accurate characterization of data trend may be generated in an efficient manner. Embodiments of the invention also relate to a system, a method and a computer readable storage medium for assigning indices to data and storing the data in a database keyed with the indices. When a query request is received, indices are first computed, and data corresponding to the indices are then retrieved. Decimation of data for retrieval is performed based on indices without having to retrieve the data from the database, which reduces the data access time associated with returning the results of the query.

Overview of System Architecture

Figure 1:
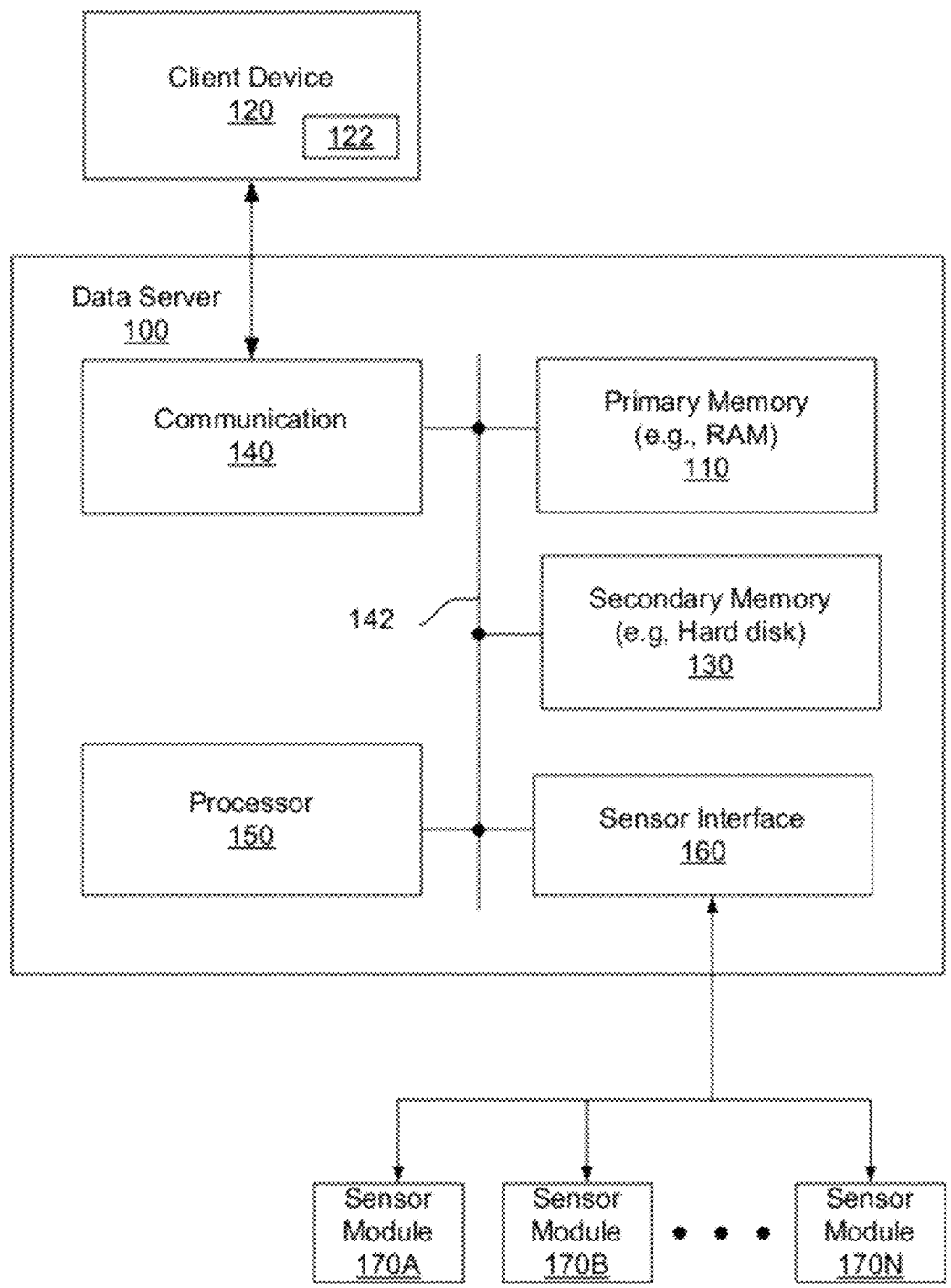
FIG. 1 is a schematic block diagram illustrating a data server, according to one embodiment.

FIG. 1 is a schematic block diagram illustrating a data server 100, according to one embodiment. The data server 100 receives data from one or more data sources such as sensor modules 170A through 170N (hereinafter collectively referred to as "the sensor modules 170"). In one embodiment, the data server 100 is also coupled to a client device 120 to provide data to the client device 120.

In one embodiment, the sensor modules 170 sense physical properties of their environment and send raw sensor data to the data server 100 via known communication channels implemented by various wireless or wired communication protocols. The physical properties to be sensed include, among other properties, temperature, humidity, light, pressure, acceleration, location (e.g., latitude and longitude), speed, altitude, orientation, heading of a vehicle, battery level, the number of GPS satellite visible, the number of cell towers in range, the radio strength of signals from the cell towers, and ambient audio level. The sensor modules 170 sense and send data to the data server 100 periodically (e.g., every 10 minutes). Alternatively, the sensor module 170 sense and send data to the data server 100 when certain events are detected (e.g., temperature rises above a threshold).

After receiving the raw sensor data, the data server 100 performs all or some of the following processes: (i) storing the raw sensor data, (ii) pre-processing the raw sensor data into pre-processed data, (iii) indexing the raw sensor data, and (iv) returning results of queries to the client device 120 responsive to receiving the queries. The data server 100 may be any computing device that is capable of storing data and processing the data. The data server 100 may include, among other components, a communication module 140, primary memory 110, secondary memory 130, a processor 150, a sensor interface 160 and a bus 142 coupling these components. The communication module 140 is a hardware component or a combination of software and hardware components that allow communication with the client device 120. In one embodiment, the communication module 140 communicates with the client device 120 via TCP/IP (Transmission Control Protocol/Internet Protocol) or other known communication protocols.

The primary memory 110 stores one or more code modules for storing and processing data received from the sensor modules 170, as described below in detail with reference to FIGS. 2 and 6. The primary memory 110 may be embodied as a computer readable storage medium including, among others, RAM (Random Access Memory). The processor 150 executes instructions as included in the code modules of the primary module 110 to perform various operations.

The secondary memory 110 stores data received from the data sources (e.g., the sensor modules 170). In one embodiment, the secondary memory 110 has a larger storing capacity compared to the primary memory 110 but has slower access speed. The secondary memory 130 may be embodied as a computer readable storage medium including, among other types, a flash memory and a hard disk.

The processor 150 reads instructions and data stored in the primary memory 110 and the secondary memory 130 via the bus 142 to perform various operations. The processor 150 may comprise various computing architectures such as a complex instruction set computer (CISC) architecture, a reduced instruction set computer (RISC) architecture, or an architecture implementing a combination of instruction sets. Although only a single processor is shown in FIG. 1, multiple processors may be included in the data server 100. The processor 150 may comprise an arithmetic logic unit, a microprocessor, a general purpose computer, or some other information appliance equipped to transmit, receive and process data from the primary memory 110 and the secondary memory 130.

The sensor interface 160 is coupled to the sensor modules 170 to receive raw sensor data from the sensor modules 170. The sensor interface 160 may be embodied as a wired communication interface including, for example, RS-232 (Recommended Standard 232), V.24, RS-42 and, RS-433. Alternatively, the sensor interface 160 may be embodied as a wireless communication interface including, for example, Bluetooth and Wi-Fi.

In one embodiment, the data server 100 communicates with the client device 120 to send results of queries in response to receiving the queries from the client device 120. The client device 120 may be any computing device that is co-located with or remotely located from the data server 100. The client device 120 may include an application program such as a web browser to access and present data received from the data server 100. The client device 120 may include, among other types, a screen 122 to display the data received from the data server 100.

In one embodiment, the data server 100 includes a screen (not shown) to present processed data directly to the user without using the client device 120. The data server 100 may also include input devices (e.g., keyboards) to interact with a user.

In one embodiment, the sensor modules 170 and the data server 100 form a Wireless Sensor Network ("WSN") as described, for example, in U.S. Pat. No. 7,369,047 to Alan S. Broad et al., which is incorporated by reference herein in its entirety. The data server 100 corresponds to a base station that collects sensor data from the sensor modules 170.

Summarizing of Data Entries

In one embodiment, the data server 100 sends summarized data sets to the client device 120 in response to receiving a query from the client device 120. The original raw data sets may be too large or impracticable for display or visualization on the client device 120. For example, a limited space in a screen may be allocated to display a graph or a chart covering a period with too many data points for display. In such case, the number of data points may exceed the number of available pixels on the screen 122 of the client device 120. Therefore, when a large number of data points are retrieved, the data points must be summarized or decimated for display on the screen 122. Even when the number of data entries does not exceed the number of pixels, it may be desirable to display only representative data points on the screen 122 to simplify the graph or chart and/or to reduce bandwidth for transmitting data between the data server 100 and the client device 120.

One way of reducing the data points for display is to randomly choose data entries for display. The randomized selection of data points, however, may result in loss of underlying trend characterization. For example, assume that data representing temperature are collected every 10 minute intervals. When displaying a temperature trend over the span of a year using only 365 pixels, 52,560 data points must be decimated to 365 data points where each data entry represents an entire day. A randomly chosen data point, however, may not adequately represent the entire day. That is, a data point may be selected during a day time to represent a day while another data point may be selected during a night time to represent another day. Therefore, a consistent and systemic method must be adopted to summarize or select data to represent the entire day.

Figure 2:
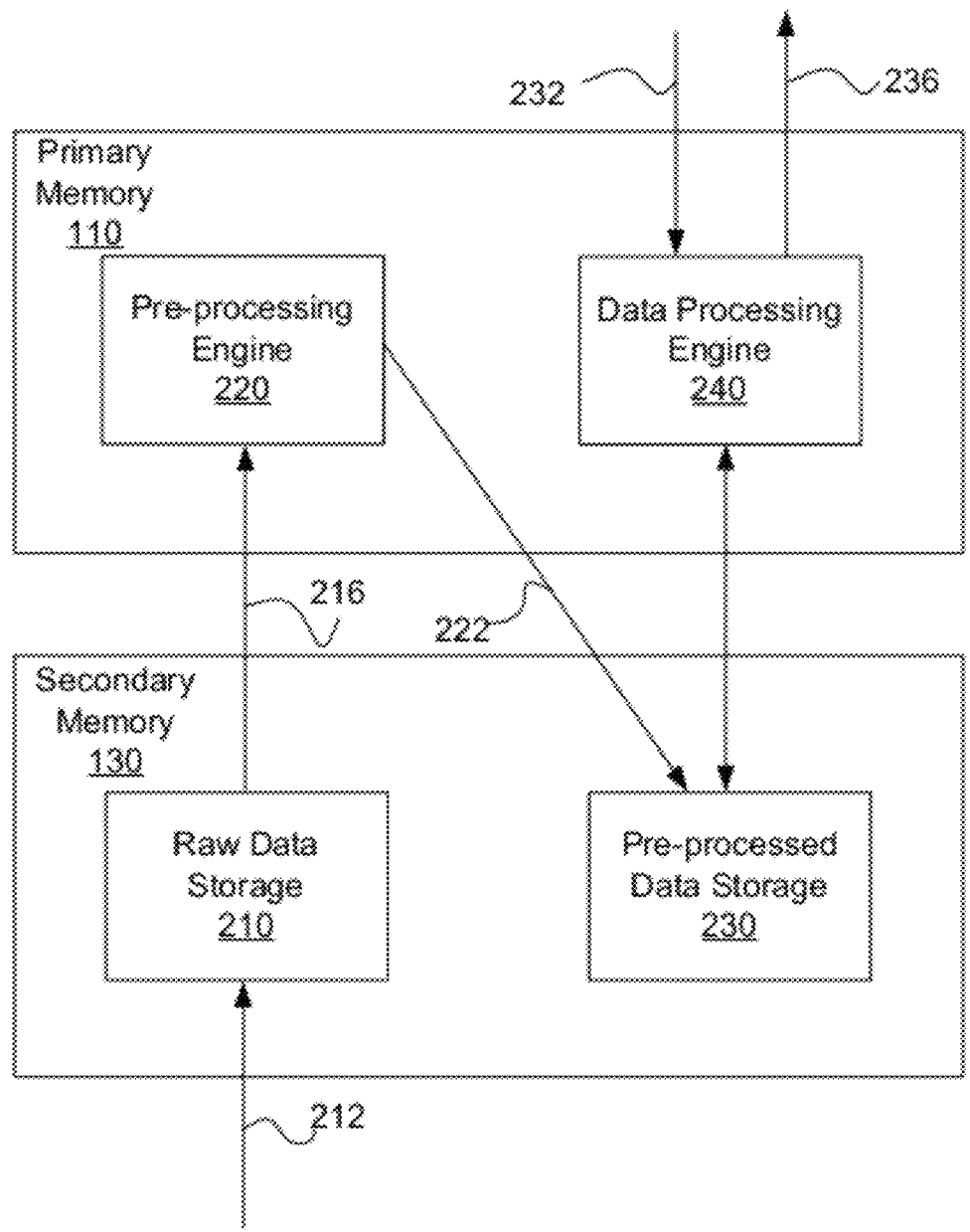
FIG. 2 is a block diagram illustrating modules in the primary memory and the secondary memory of the data server for summarizing data, according to one embodiment.

FIG. 2 is a block diagram illustrating code modules in the data system 100 for summarizing raw data entries, according to one embodiment. The primary memory 110 stores, among other components, a pre-processing engine 220 and a data processing engine 240. The secondary memory 130 includes, among other components, raw data storage 210 and pre-processed data storage 230. The raw data storage 210 receives and stores raw data 212 from the sensor modules 170. In one embodiment, the raw data storage 210 is embodied as a database.

The pre-processing engine 220 is coupled to the raw data storage 210 to receive stored raw data 216. The pre-processing engine 220 performs pre-processing on the received raw data 216, and stores pre-processed data 222 in the pre-processed data storage 230. The pre-processed data storage 230 may be embodied as a database. In one embodiment, the raw data storage 210 and the pre-processed data storage 230 are embodied as a single database. The data processing engine 240 is coupled to the pre-processed data storage 230. The data processing engine 240 receives queries 232 from the client device 120, retrieves appropriate pre-processed data from the pre-processed data storage 230, and returns the query results 236 to the client device 120.

In one embodiment, the raw data storage 210 stores data in the form of a table including a timestamp field, a sensor ID field, and one or more sensor data fields. The timestamp field indicates the time when the sensor data was generated by the sensor modules 170 or when the sensor data were collected by the data server 100. The sensor ID field includes unique_id indicating which of the sensor modules 170 generated the sensor data. Each sensor data field stores the sensed values of physical properties (e.g., temperature or humidity).

Figure 3:
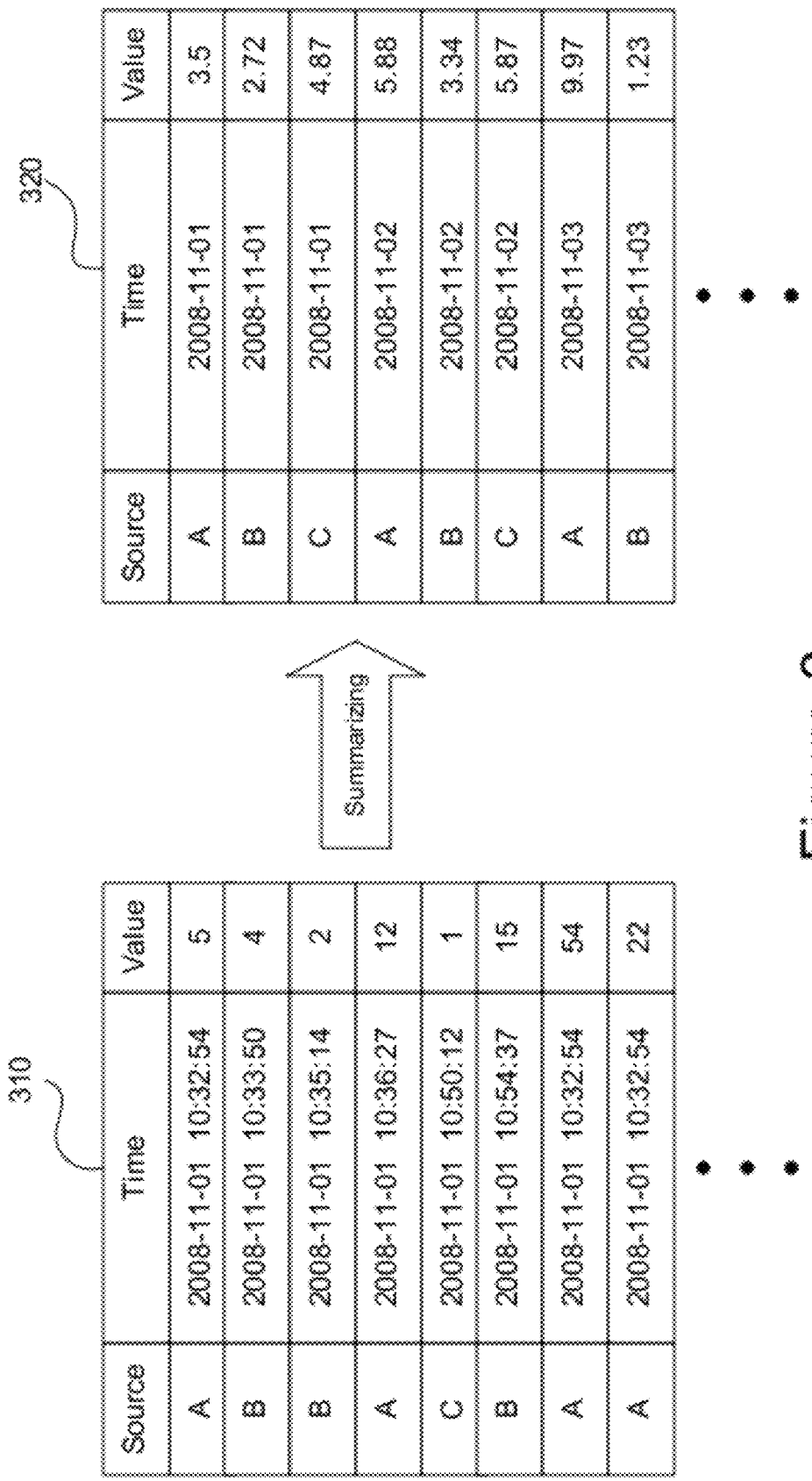
FIG. 3 is a diagram illustrating summarizing of raw sensor data into pre-processed data, according to one embodiment.

FIG. 3 is a diagram illustrating summarizing of data entries 310, according to one embodiment. In this example, data entries in the raw data table 310 (stored in the raw data storage 210) are summarized into summarized data entries in a pre-processed data table 320 (stored in the pre-processed data storage 230). In the raw data table 310, a "Source" field indicates the identity of the sensor module 170 that generated the sensor data, a "Time" field represents a timestamp indicating when the sensor data was generated by the sensor module 170A through 170N, and a "Value" field indicates the value of physical properties sensed by the sensed modules 170.

In the example of FIG. 3, the raw data entries covering 24 hours are summarized into a summarized data entry in the pre-processed data table 320. For this purpose, the pre-processing engine 220 retrieves all entries of a data source (A, B or C) within a time interval (i.e., 24 hours), pre-processes the retrieved entries, and stores the pre-processed data entry in the pre-processed data table 320. In one embodiment, the pre-processing engine 220 generates separate entries for each data source.

In one embodiment, separate tables are created during the pre-processing to cover different time intervals (e.g., day, month and year). When a query request is received from the client device 120, the data processing engine 240 determines an appropriate pre-processed data table based on the requested range and the number of data entries. The data processing engine 240 then retrieves data entries from the selected pre-processed data table, and processes further before returning the results to the client device 120.

In one embodiment, the pre-processing is performed offline before receiving queries from the client device 120. In this way, the data processing engine 240 can promptly retrieve pre-processed data entries from the pre-processed data storage 230, process the retrieved data if needed, and forward the results of the queries to the client device 120 without a delay associated with summarizing the data entries.

Figure 4:
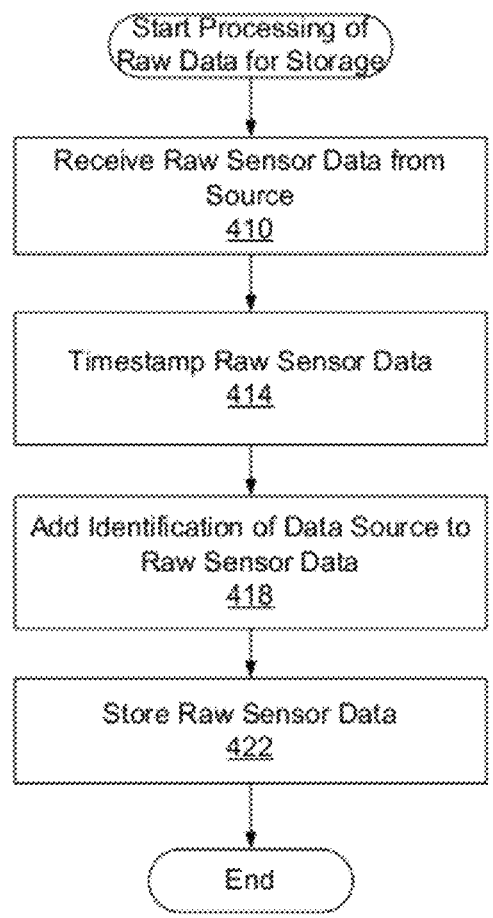
FIG. 4 is a flowchart illustrating a process of storing raw sensor data for pre-processing, according to one embodiment.

FIG. 4 is a flowchart illustrating a process of storing the raw data for pre-processing, according to one embodiment. First, the data server 100 receives 410 raw sensor data from the data sources (e.g., the sensor modules 170). The raw sensor data are time-stamped 414 to indicate the time the raw sensor data are generated by the sensor modules 170 or received at the data server 100. unique_id indicating the sensor module from which the raw sensor data originated is added 418 to the raw sensor data. The process of time-stamping 414 or adding 418 identification of data source may be performed by the sensor modules 170 or the data server 100. The raw data with the timestamp and the unique_id are then stored 422 in the raw data storage 210.

Figure 5:
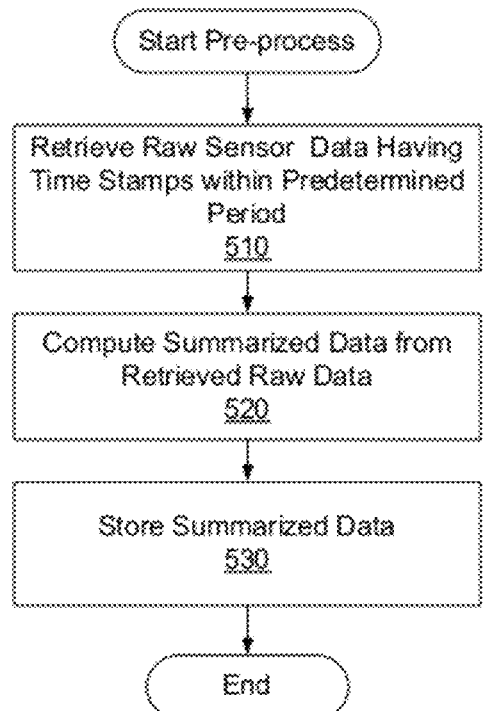
FIG. 5 is a flowchart illustrating the pre-processing of raw sensor data, according to one embodiment.

FIG. 5 is a flowchart illustrating pre-processing of raw data entries, according to one embodiment. First, the raw sensor data having timestamps within a predetermined time period are retrieved 510 from the raw data table 310 by the pre-processing engine 220. Based on the retrieved raw data entries, the pre-processing engine 220 computes 520 summarized data entries. The summarizing 520 may involve using various computational algorithms including but not limited to (i) averaging, (ii) selecting a minimum or maximum value, (iii) polynomial fitting, and (iv) selecting a median value. The summarized data entries are then stores 530 in the pre-processed data table 320.

Index-Based Decimation

When a query for data entries is received at a data server, a binary search is performed by the database management system to return all the data entries that satisfy query conditions. If the number of returned data points is excessively large, the data points are decimated and then sent to the client device 120. Assuming that the size of entire data entries in the database is N, the size of the queried result data entries is M, and the size of decimated result data points is m, the overall time required for returning the data sets to the client device is as follows:

$$\text{Overall Time} = O(\log(N) + M + m) \quad (1)$$

In some cases, the size of queried result data entries may be quite large (i.e., large M). If the number M of returned data entries is in the order of N, the efficiency of process associated with querying and decimating the results is dominated by the size of M. That is, the above equation (1) is reduced to:

$$\text{Overall Time} = O(M) \approx O(N) \quad (2)$$

If a large number of queried data is decimated after being retrieved, time consumed in searching and retrieving matching data entries is largely wasted. For example, if the client device 120 is generating a graph with only five data points but the query on the database resulted in millions of hits, only five data points are needed. Therefore, the rest of data points are discarded, resulting in a huge waste of resources in searching and returning millions of data points. Such process is inefficient in that an excessive amount of time is spent on querying for data points that are eventually unused. The data points are generally stored in and retrieved from secondary memory into primary memory before returning the data to the client device 120. The second memory has slower data access speed, and therefore, the increased amount of data retrieval from the secondary memory delays the overall process. Further, a large amount of primary memory is required to store and process (e.g., decimate data or select data) large amounts of data entries retrieved from the database.

In one embodiment, the data received from data sources are selected and/or decimated by count-based indices. The data entries are stored in a database keyed with the count-based indices. The count-based indices represent tallies of data points received sequentially from a data source. For example, a count-based index of 5 indicates that the corresponding data entry is a fifth data point received from the data source. After querying starting and ending data entries in a database, the count-based indices are used to select and decimate data points between the starting and ending data points. That is, the data entries to be retrieved are determined based on the indices. Data entries for only the computed indices are then retrieved from a database. By simplifying the search performed on the database and reducing the number of data entries retrieved, the process of returning the results of the query to the client device 120 may be expedited.

Figure 6:
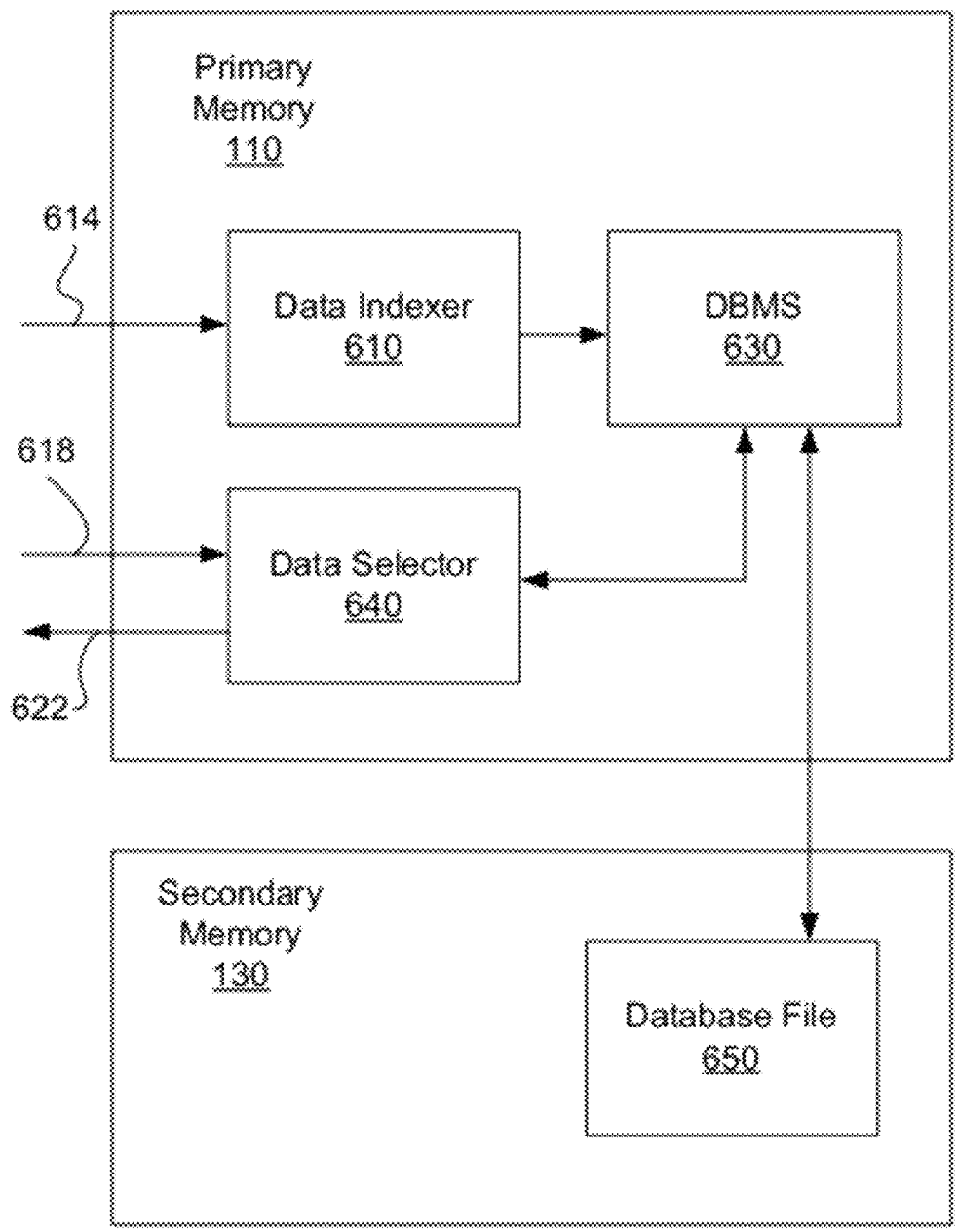
FIG. 6 is a block diagram illustrating modules in the primary memory and the secondary memory of the data server for performing index-based data decimation, according to one embodiment.

FIG. 6 is a block diagram of the primary memory 110 and the secondary memory 130 of the data server 100 for determining data entries based on count-based indices, according to one embodiment. The primary memory 110 includes, among other components, a data indexer 610, a database management system (DBMS) 630 and a data selector 640. After receiving data 614 from the sensor modules 170, the data indexer 610 assigns unique_id and count to the data 614. unique_id indicates the source of the data (i.e., which of the sensor modules 170 generated the data). unique_id is used to derive a lookup key for data entries for certain sensor modules 170. count is a count-based index indicating the number of data entries received from a sensor module. count is also used as a key for querying the data entries in a database file 650. The data keyed with unique_id and count are sent to the DBMS 630. The DBMS 630 then stores the data received from the data indexer 610 in the database file 650 stored in the secondary memory 130.

The data selector 640 receives queries 618 from the client device 120. The data selector 640 determines the data entries to be retrieved based on unique_id and count, as described below in detail with reference to FIG. 8. The retrieved results 622 are then sent to the client device 120. In one embodiment, the data entries are grouped by unique_id and stored in separate data silos.

Figure 7:
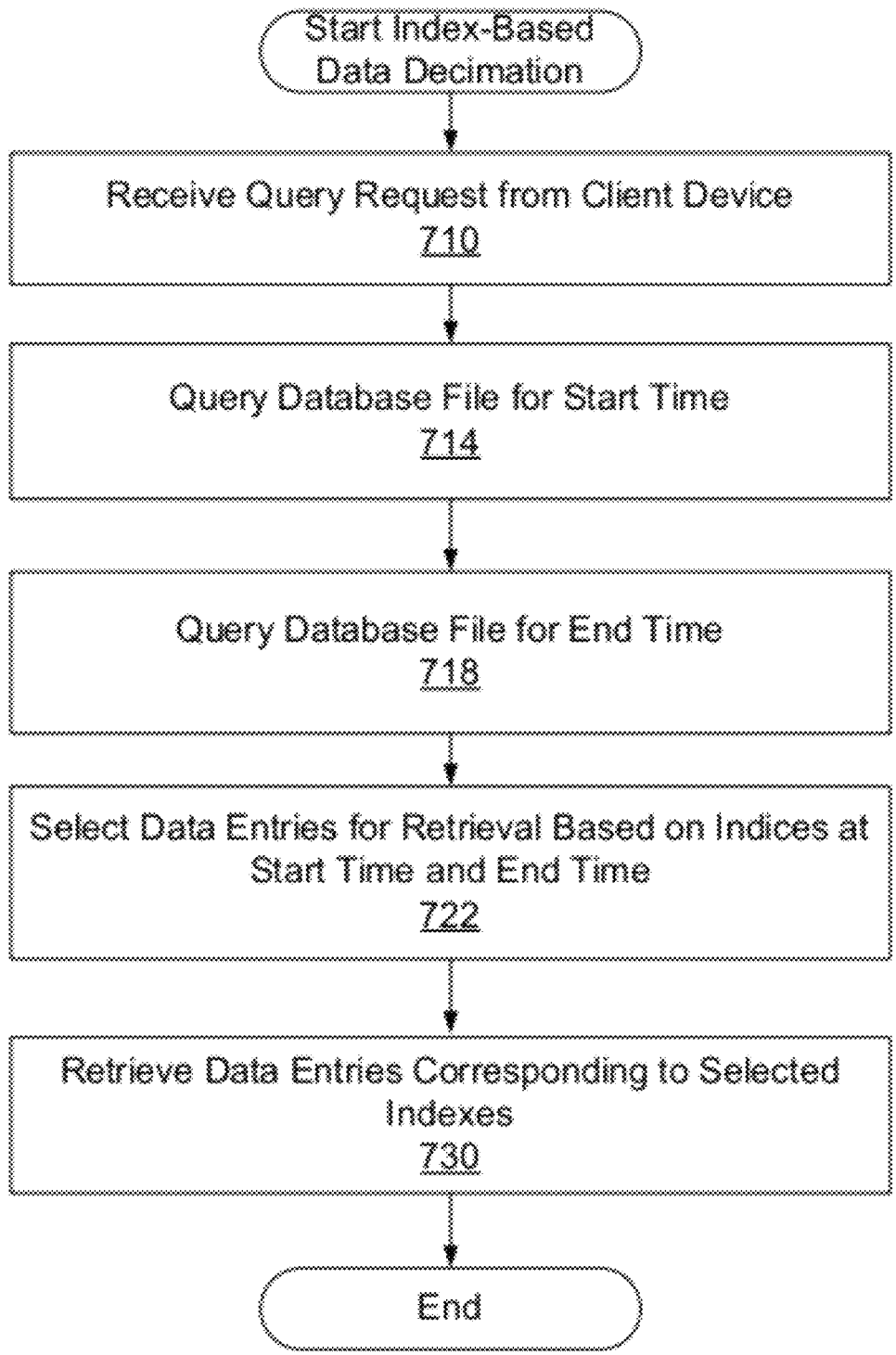
FIG. 7 is a flowchart illustrating a process for performing index-based data decimation, according to one embodiment.

FIG. 7 is a flowchart illustrating a process of performing index-based data decimation, according to one embodiment. First, the data selector 640 receives 710 a query request from the client device 120. The query request may indicate, among other things, the data source of interest, the starting time, the ending time, and the maximum number of data (i.e., limit) to be returned. Assuming that the data entries in the database file 650 is ordered by time (result_time), the database file 650 is queried 714 for first reading of data entry within the time range using, for example, the following query language:

SELECT*FROM table WHERE unique_id=uid AND result_time>=start AND LIMIT=1 (3)

where "uid" represents the data source of interest, "start" represents the start time and "LIMIT" indicates the number of data entries to be returned. This query operation requires time of $O(\log(N))$.

Assuming that the data entries in the database file 650 is ordered by time (result_time), the database file 650 is also queried 718 for a last reading of data entry in the time range using, for example, the following query language:

SELECT*FROM table WHERE unique_id=uid AND result_time<=end AND LIMIT=1 (4)

where "end" represents the end time of the query. This query operation requires time of $O(\log(N))$.

After retrieving the query results for the first reading and the last reading of the data entries, the entries to be retrieved are determined 722 based on the index of the first reading and the index of the last reading. In one embodiment, the increment of index for entries to be retrieved are computed using the pseudo-code provided in following Table 1 where limit represents the maximum number of data entries to be sent to the client device 120.

TABLE 1

Pseudo-code for computing count increment

| | |
|---|---|
| count_end = reading_last.count | # index of last point |
| count_start = reading_first.count | # index of start point |
| count_end_n = count_end − 1 | # index of neighbor to first point |
| count_start_n = count_start + 1 | # index if neighbor to last point |
| count = count_end_n − count_start_n | |
| if limit >= count: increment = 1 | |
| else: increment = int (round(count/limit +0.5)) | |

The algorithm as represented by the pseudo-code in Table 1 is merely illustrative, and various other algorithms may be used to compute the indices.

Based on the increment determined according to pseudo-code of Table 1, an array of indices for retrieval is computed using the following command:

indices=range(count_start_*n*,count_end,increment) (5)

The data entries corresponding to the array of indices are then retrieved 730 from the database file 650. The overall time for retrieving the data entries is $O(m)$ where m is the number of data retrieved rather than the number of the entire data entries within the start time and the end time.

The overall time for the count-based decimation is the sum of two indexed searches (one for finding the start data entry and the other for the end data entry) and the retrieving of decimated result data set from the database file 650. Assuming that the size of the entire data entries in the database file is N, the size of the queried results set is M, and the size of decimated result set is m, the overall time for the count-based decimation can be expressed in the following equation:

Overall Time=$O(2*\log(N)+m)$ (6)

Compare this with equation (1) where the overall time is $O(\log(N)+M+m)$. In many applications, M is larger than log (N). Therefore, in most cases, the indexed-based decimation is more efficient than retrieving all matching data entries and then decimating the result.

The process of determining the array of indices is performed advantageously by the data selector 640 embodied on the primary memory 110 without retrieving the data entries from the database file 650 stored in the secondary memory 130. The secondary memory 130 has a slower data access speed compared to the primary memory 110. Therefore, the process of determining the data entries to be retrieved is faster compared to retrieving all the matching data entries from the secondary memory 130 and then decimating the matching entries. Further, only data entries to be returned to the client device 120 are retrieved from the database file 650. This reduces the data access time, and thereby, decreases the time for returning the data entries to the client device 120.

Figure 8:
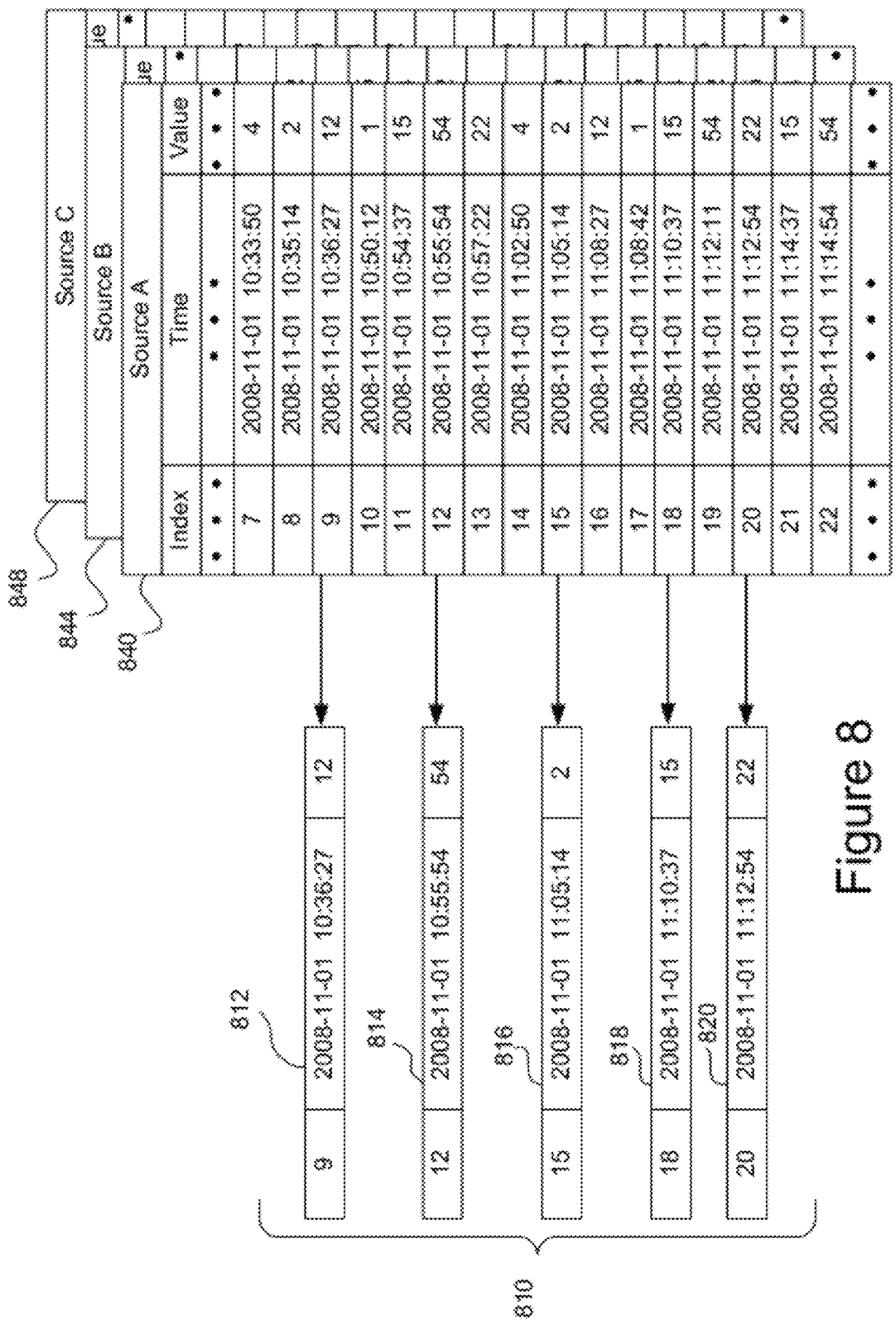
FIG. 8 is a diagram illustrating performing index-based data decimation, according to one embodiment.

FIG. 8 is a diagram illustrating an example of determining data entries for retrieval based on count-based indices, according to one embodiment. Each of the tables 840, 844, 848 represents data silos storing data originating from a single data source. Data entries in the tables 840, 844, 848 include, among other fields, indices, timestamps, and data values. In the example of FIG. 8, assume that the client device 120 requested five data from "source A" having the timestamp between 2008-11-01, 10:36:00 and 2008-11-01, 11:13:00. A binary search is first performed on the table 840 to determine a data entry having a timestamp after 10:36:00 (starting data entry). The query results in a data entry 812 represented by index 9 and the timestamp of 2008-11-01, 10:36:27.

Another binary search is then performed on the table 840 for the last reading having timestamp before 2008-11-01, 11:13:00 (ending data entry). The query results in a data entry 820 represented by count 20 and a timestamp of 2008-11-01, 11:12:54. There are a total of 12 entries from count 9 to count 20. Assuming that the maximum number of data to be returned is 5 (that is, limit=5), an increment of 3 is computed by the pseudo-code in Table 1. Therefore, data entries having the following indices are computed for retrieval: 12 (=9+3), 15 (=12+3), and 18 (=15+3). The data entries 814, 816, 818 corresponding to the indices of 12, 15, and 18 are retrieved from the table 840. The retrieved data entries 810 may then be sent to the client device 120 as the result of the query.

The indices may also be used to retrieve additional data entries for more detailed presentation of data on the screen 122 of the client device 120. After the results of a query are returned, additional data points within the same time range as the previous time range or a subset of previous time range may be requested. Because the data entries in the database file 650 is keyed by count-based indices, additional data points may also be computed efficiently using these indices.

Figure 9:
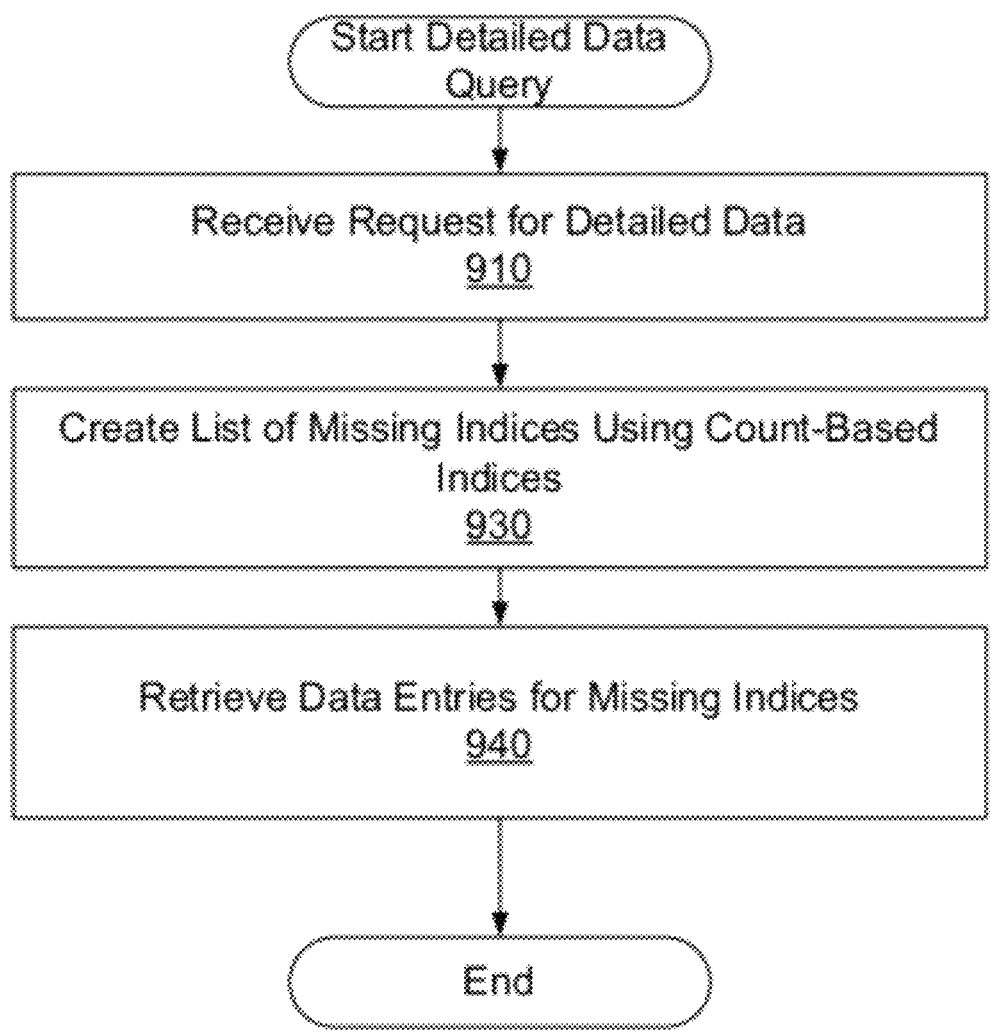
FIG. 9 is a flowchart illustrating a process for querying additional data points using indices, according to one embodiment.

FIG. 9 is a flowchart illustrating a process for querying additional data points using indices, according to one embodiment. First, a request for detailed data points is received from the client device 120. Then a list of missing indices is created 930 using the indices, as described below in detail with reference to FIG. 10. In one embodiment, every Nth index over the previous list of indices of retrieved data entries is retrieved as missing indices where N is as follows:

$$N = (\text{length of new index list}) MOD (\text{maximum required data points}) \quad (7)$$

The data entries for the missing indices are then retrieved 940.

Figure 10:
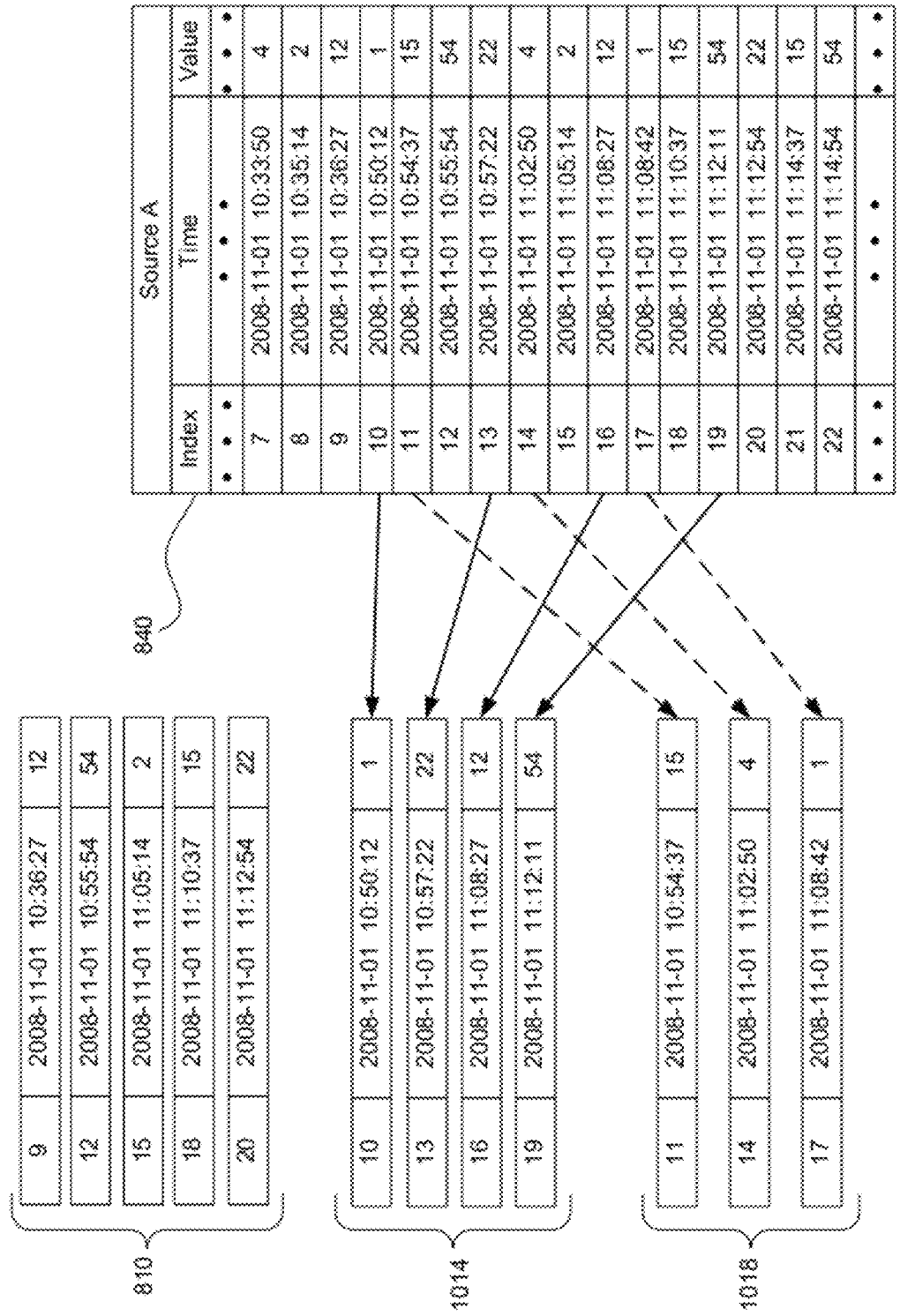
FIG. 10 is a diagram illustrating computing of additional data entries in response to a detailed data query for the same time range as a previous index-based query, according to one embodiment.

FIG. 10 is a diagram illustrating selecting of additional data entries in response to a detailed data query for the same time range as a previous index-based query, according to on embodiment. In addition to the results 810 of a previous query, two sets of additional data entries 1014, 1018 are retrieved to provide more detailed data to the client device 120. The indices for the first set 1014 of additional data entries are obtained by adding an integer of one (1) to the indices of previous results 810. That is, indices of 10 (=9+1), 13 (=12+1), 16 (=15+1) and 19 (=18+1) are obtained for the first additional data sets 1014. The index 21 (=20+1) is excluded from retrieval because it is beyond the final reading (index of 20). The data entries corresponding to the indices of 10, 13, 16 and 19 are then retrieved from the table 840, and sent to the client device 120.

Similarly, indices for the second set 1018 of additional data entries are obtained by adding an integer of two (2) to the indices of previous results 810. That is, indices of 11 (=9+2), 14 (=12+2) and 17 (=15+2) are obtained for the second set 1018 of additional data entries. A data entry having the count of 20 (=18+2) is not retrieved because this data entry was returned in the previous result 810. A data entry having the count of 22 (=20+2) is excluded because it is beyond the final reading (index of 20).

The additional sets of data points to be retrieved are determined by adding integers to the previously retrieved data entries. In this way, indices for evenly distributed data points may be obtained. The additional data sets to be retrieved are also determined efficiently because the additional queries on the database need not be performed. The data entries to be retrieved are determined promptly by computing corresponding indices obtained in the previous query, and therefore, data entries to be retrieved are determined efficiently.

In one embodiment, an initial set of data (e.g., data set 810) is first sent to the client device 120 and then additional sets of data (e.g., data sets 1014 and 1018) are transmitted to the client device 120. In this way, the client device 120 may present a coarse graph or a chart based on the initial set of data, and then present a more refined graph or chart as subsequent sets of data are received, despite limited network bandwidth or other restrictions.

Figure 11:
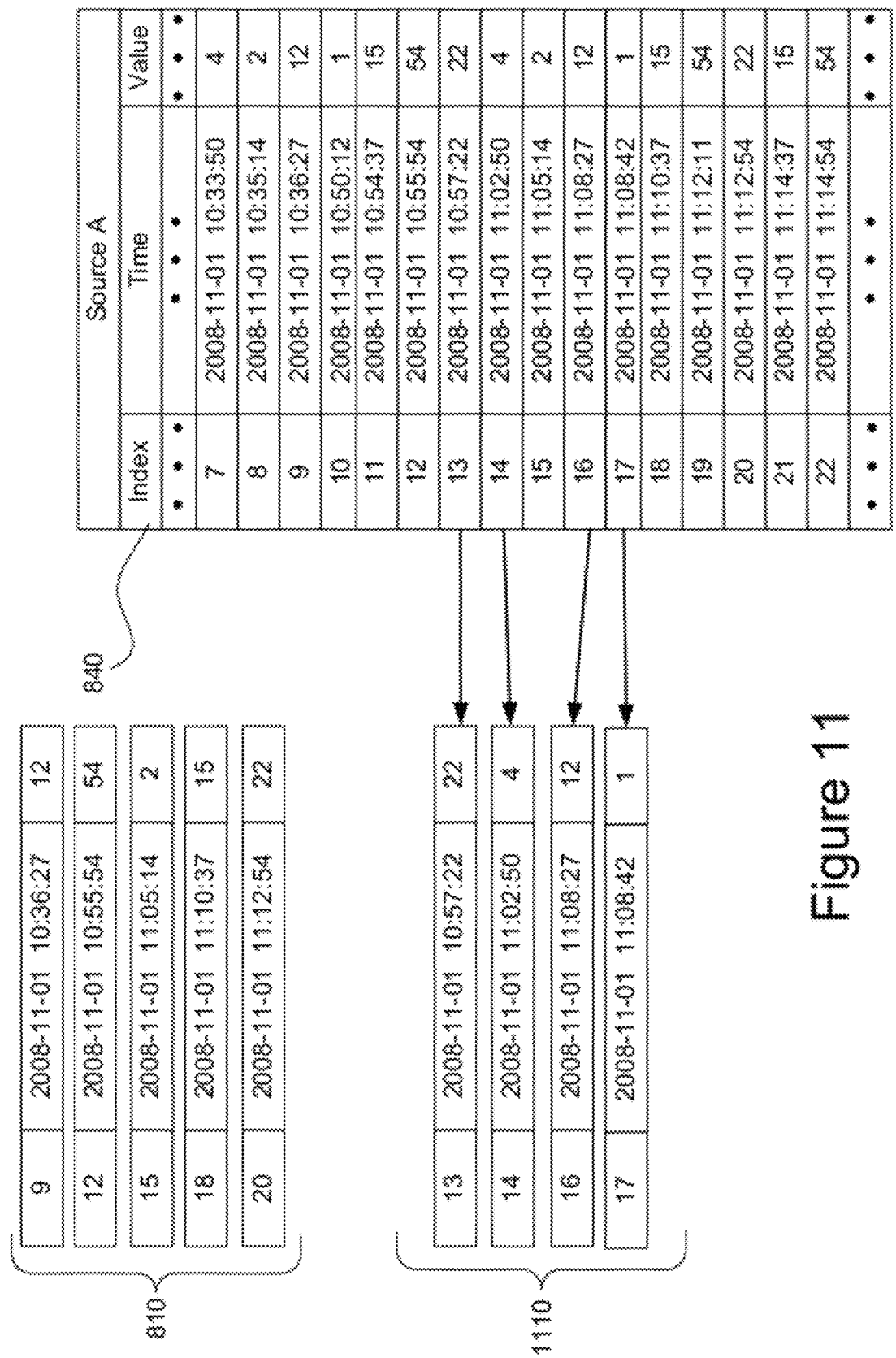
FIG. 11 is a diagram illustrating computing of new data entries in response to a data query for a narrow time range than a previous index-based query, according to one embodiment.

FIG. 11 is a diagram illustrating selecting of new data entries in response to a data query for a narrow time range than a previous index-based query, according to one embodiment. A user may want to 'zoom' into a narrower time range after viewing data over a wider range of time frame. In such case, the data entries within the narrower 'zoom' time range may be determined by searching the previous data entries for indices corresponding to the new start time and corresponding to a new end time. Because the 'zoom' time range is a subset of the previous time range, finding the indices is guaranteed. After the first reading (the data entry having an index of 13) and the last reading (the data entry having an index of 17) are identified by the searches, the intermediate data points are determined in the same manner, as described above with reference to FIG. 8.

The count-base decimation is advantageous, among other reasons, because: (i) the process is efficient because only required data entries are retrieved instead of all data entries in selected time range, (ii) the data server 100 returns the exact number or less of data entries as requested by the client device 120, (iii) the data points selected or decimated are not random and remain the same under the same querying conditions, (iv) the distribution of data retrieved are evenly distributed and better shows the trend or characteristics of data points, (v) additional data entries are efficiently retrieved using indices, and (vi) additional data entries retrieved are unique and disjoint from any previous data entries retrieved.

Example Embodiment Using Count-Based Decimation

Figure 12A:
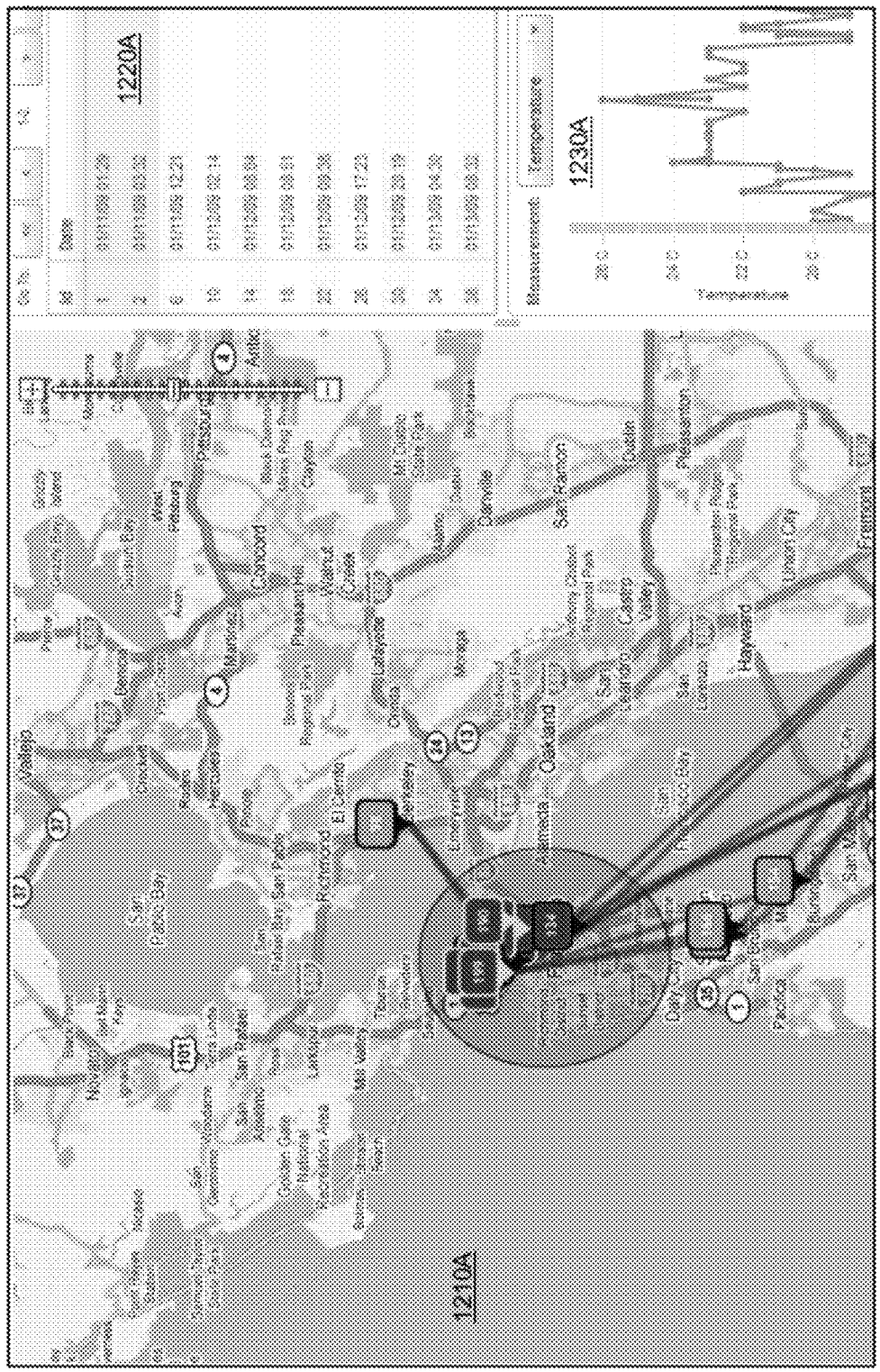
FIGS. 12A and 12B are graphic representations of a user interface for tracking a wireless tracking module, according to one embodiment.
Figure 12B:
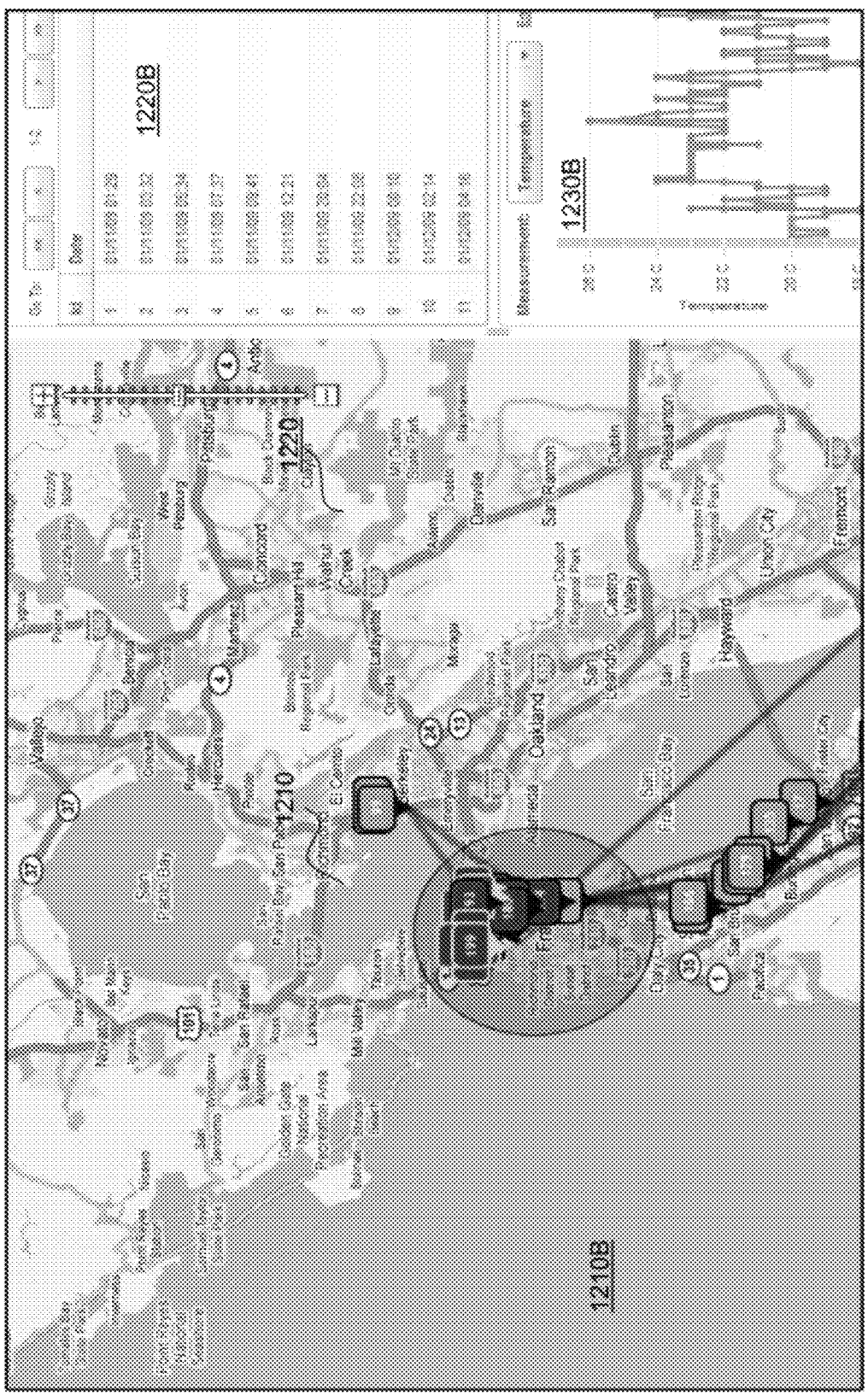

FIGS. 12A and 12B are graphic representations of a user interface for tracking a wireless tracking module, according to one embodiment. The wireless tracking module senses temperature or other physical properties of its surroundings and sends sensed data together with its location information to a data server. A client device accesses the data server to receive the data and displays on its screen the user interface, as illustrated in FIGS. 12A and 12B.

The user interfaces of FIGS. 12A and 12B include map views 1210A, 1210B, data entry views 1220A, 1220B, and graph views 1230A, 1230B. The map views 1210A, 1210B indicate the location of the wireless tracking module for different data points. The data entry views 1220A, 1220B indicate the unique identities of data points and their timestamps. The graph views 1230A, 1230B depict the changes in temperature at different locations of the wireless tracking module across different data points.

When the application (e.g., Internet browser) associated with the wireless tracking module is launched on the client device 120, a subset of available data points are selected (as described above with reference to FIG. 7) and received from the data server to display images as illustrated in FIG. 12A. As indicated in the "id" field of the data entry view 1220A, one out of five data points (except for first two data entries) are displayed in the map view 1210A and the graph view 1230A of FIG. 12A.

Subsequently, as additional data points are received at the client device, more detailed information is presented on the user interface. FIG. 12B illustrates the results after additional data points are received. As indicated in the "id" field of the data entry view 1220B, all the data points are being displayed on the map view 1210B and the graph view 1230B. The additional data points may be selected and retrieved using the process, as described above with reference to FIG. 9.

Alternative Embodiments

In one embodiment, the data source is a device other than the sensor module. For example, the data may be provided by databases, manual inputs by users or other computing devices. After the data are received at the data server, the data may be pre-processed or indexed in the same manner as data from the sensor modules.

In one embodiment, the data server includes hardware or software components for transmitting data to the client device using HTTP (Hypertext Transfer Protocol) or Ajax (Asynchronous JavaScript and XML).

As noted above, embodiments may be configured as software elements or modules. The software may include processes that are written or coded as instructions using a programming language. Examples of programming languages may include C, C++, BASIC, Perl, Matlab, Pascal, Visual BASIC, JAVA, ActiveX, assembly language, machine code, and so forth. The instructions may include any suitable type of code, such as source code, object code, compiled code, interpreted code, executable code, static code, dynamic code, and the like. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application programming interfaces (API), instruction sets, computing code, computer code, code segments, computer code segments, words, values, symbols, or any combination thereof. The embodiments are not limited in this context.

What is claimed is:

1. A computer-implemented method for displaying a visual representation of data on a screen, comprising:

receiving a set of data, each data associated with a timestamp;

assigning indices to the set of data ordered according to the timestamp;

receiving a request to retrieve a subset of the data associated with the timestamps within a time range;

determining the number of data within the time range responsive to receiving the request, comprising:

searching for a first datum having a first timestamp after a starting time of the time range;

searching for a last datum having a second time stamp before an ending time of the time range;

determining a first index corresponding to the first datum;

determining a last index corresponding to the last datum; and obtaining a difference between the first index and the last index;

computing indices corresponding to data for retrieval within the time range responsive to the number of data within the time range exceeding a predetermined number, comprising:

determining a count value corresponding to a difference between the first index and the last index;

determining an increment value for indices based on the count value divided by the predetermined number; and creating an array of indices for retrieval of the first data by adding multiples of the increment value to the first index;

retrieving first data corresponding to the computed indices; and displaying a visual representation of the set of data on the screen based on the first data.

2. The method of claim 1, further comprising:

obtaining additional indices between the computed indices;

retrieving second data corresponding to the additional indices; and displaying another visual representation including the first data and the second data.

3. The method of claim 1, wherein each of the data represents physical properties detected by a sensor module.

4. The method of claim 3, wherein the physical properties include one or more of temperature, humidity, light, pressure, acceleration, location, speed, altitude, orientation, heading of a vehicle, battery level, a number of Global Positioning System (GPS) satellite visible, a number of cell towers in range, strength of radio signals from the cell towers, and an ambient audio level.

5. A computer readable storage medium structured to store instructions executable by a processor in a computing device, the instructions, when executed causing the processor to:

receive a set of data, each data associated with a timestamp;

assign an index to each data ordered according to the timestamp;

receive a request to retrieve a subset of the data associated with the timestamps within a time range;

determine the number of data within the time range responsive to receiving the request, instructions causing the processor to determine the number of data comprising instructions causing the processor to:

search for a first datum having a first timestamp after a starting time of the time range;

search for a last datum having a second time stamp before an ending time of the time range;

determine a first index corresponding to the first datum;

determine a last index corresponding to the last datum; and obtain a difference between the first index and the last index;

compute indices corresponding to data for retrieval within the time range responsive to the number of data within the time range exceeding a predetermined number, instructions causing the processor to compute the indices corresponding to the data for retrieval comprising instructions causing the processor to:

determine a count value corresponding to a difference between the first index and the last index;

determine an increment value for indices based on the count value divided by the predetermined number; and creating an array of indices for retrieval of the first data by adding multiples of the increment value to the first index;

retrieve first data corresponding to the computed indices; and display a visual representation of the set of data on the screen based on the first data.

6. The computer readable storage medium of claim 5, further storing instructions to:

obtain additional indices between the computed indices;

retrieve second data corresponding to the additional indices; and display another visual representation including the first data and the second data.

7. The computer readable storage medium of claim 5, wherein each of the data represents physical properties detected by a sensor module.

8. The computer readable storage medium of claim 7, wherein the physical properties include one or more of temperature, humidity, light, pressure, acceleration, location, speed, altitude, orientation, heading of a vehicle, battery level, a number of Global Positioning System (GPS) satellite visible, a number of cell towers in range, strength of radio signals from the cell towers, and an ambient audio level.

9. A computing device for processing and retrieving data for display on a screen, the computing device comprising:

a processor;

an interface configured to receive a set of data, each data associated with a timestamp;

a data indexer configured to assign an index to each data ordered according to the timestamp;

a data selector configured to:

receive a request for a subset of the data associated the timestamps within a time range;

determine the number of data within the time range responsive to receiving the request by:

searching for a first datum having a first timestamp after a starting time of the time range;

searching for a last datum having a second time stamp before an ending time of the time range;

determining a first index corresponding to the first datum;

determining a last index corresponding to the last datum; and obtaining a difference between the first index and the last index;

compute indices corresponding to data for retrieval within the time range responsive to a number of data within the time range exceeding a predetermined number by:

determining a count value corresponding to a difference between the first index and the last index;

determining an increment value for indices based on the count value divided by the predetermined number; and creating an array of indices for retrieval of the first data by adding multiples of the increment value to the first index; and retrieve first data corresponding to the computed indices; and a communication module configured to send the first data to a client device for displaying a visual representation of the set of data on the screen based on the first data.

10. The computing device of claim 9, wherein each of the data represents physical properties detected by a sensor module.

11. The computing device of claim 10, wherein the physical properties include one or more of temperature, humidity, light, pressure, acceleration, location, speed, altitude, orientation, heading of a vehicle, battery level, a number of Global Positioning System (GPS) satellite visible, a number of cell towers in range, strength of radio signals from the cell towers, and an ambient audio level.

* * * * *